(12) United States Patent
Hemphill et al.

(10) Patent No.: US 6,197,184 B1
(45) Date of Patent: Mar. 6, 2001

(54) METHOD OF PRODUCING HIGH QUALITY OXIDE FOR ELECTROLYTIC CAPACITORS

(75) Inventors: Ralph Jason Hemphill, Liberty; Thomas Flavian Strange, Easley, both of SC (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 09/183,442

(22) Filed: Oct. 29, 1998

(51) Int. Cl.⁷ .............................. C25D 9/00; C25D 11/00
(52) U.S. Cl. ........................ 205/333; 205/152; 205/316; 205/322; 205/323; 205/324
(58) Field of Search ................................ 205/316, 322, 205/323, 324, 333, 152

(56) References Cited

U.S. PATENT DOCUMENTS

| | | | |
|---|---|---|---|
| 4,252,575 | 2/1981 | Bernard | 148/6.27 |
| 4,385,342 | 5/1983 | Puppolo et al. | 361/433 |
| 4,426,260 | 1/1984 | Stevens | 204/33 |
| 4,481,084 | 11/1984 | Chen et al. | 204/42 |
| 4,942,501 | 7/1990 | MacFarlane et al. | 361/523 |
| 4,969,974 | * 11/1990 | Kunugihara et al. | 216/53 |
| 5,078,845 | * 1/1992 | Kunugihara et al. | 205/153 |
| 5,131,388 | 7/1992 | Pless et al. | 128/419 D |
| 5,143,591 | 9/1992 | Shaffer | 205/50 |
| 5,146,391 | 9/1992 | MacFarlane et al. | 361/525 |
| 5,153,820 | 10/1992 | MacFarlane et al. | 361/525 |
| 5,449,448 | 9/1995 | Kurihara et al. | 205/153 |
| 5,503,718 | 4/1996 | Kakizakai | 216/6 |
| 5,522,851 | 6/1996 | Fayram | 607/5 |
| 5,660,737 | 8/1997 | Elias et al. | 216/6 |
| 5,715,133 | 2/1998 | Harrington et al. | 361/500 |
| 5,858,199 | * 1/1999 | Hanak | 205/687 |

* cited by examiner

Primary Examiner—Kathryn Gorgos
Assistant Examiner—Wesley A. Nicolas
(74) Attorney, Agent, or Firm—Steven M. Mitchell

(57) ABSTRACT

An oxide dissolving acid dip is integrated into an anodic foil formation process. After a foil, either etched or un-etched, is hydrated in a bath of deionized water at an elevated temperature, the foil is then dipped in an organic acid mixture. Next, an oxide layer formation step is utilized to form a barrier oxide layer on a surface of the foil. Next, an oxide dissolving acid dip is utilized to selectively remove a diffuse hydrate layer formed in the formation process. The diffuse hydrate layer is responsible for the reduction of capacitance of the anodic foil. By the use of this oxide dissolving acid dip in conjunction with an organic acid dip, the foil exhibits reduced leakage current properties, while maintaining its capacitance. The treated foil can then be incorporated into a high voltage electrolytic capacitor suitable for use in an implantable cardioverter defibrillator.

18 Claims, 4 Drawing Sheets

METHOD OF PRODUCING HIGH QUALITY OXIDE FOR ELECTROLYTIC CAPACITORS

BACKGROUND OF THE INVENTION

1. Field of the Invention

This invention relates generally to a treatment process for anodic foils to be used in electrolytic capacitors. This invention also relates to a high capacitance, low leakage current anodic foil created by the foil treatment process, an electrolytic capacitor incorporating this anodic foil, and an implantable cardioverter defibrillator (ICD) incorporating this electrolytic capacitor.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an implantable cardioverter defibrillator (ICD), also referred to as an implantable defibrillator, since the high voltage capacitors used to deliver the defibrillation pulse can occupy as much as one third of the ICD volume.

ICDs are typically implanted in patients suffering from potentially lethal cardiac arrhythmias. Arrhythmia, meaning "without rhythm," denotes any variance from normal cardiac rhythm. Heartbeat irregularities are fairly common and many are harmless. A severe heartbeat irregularity known as ventricular tachycardia refers to a runaway heartbeat.

Fibrillation is an irregular rhythm of the heart caused by continuous, rapid, electrical impulses being emitted/discharged at multiple locations known as foci in the heart's atria and ventricles. Because a fibrillating heart is unable to properly pump blood through a patient's body, the longer a patient is in fibrillation, the greater the potential damage that can occur to the patient's heart. Thus, after the start of fibrillation, it is preferable to apply defibrillating therapy to the patient as soon as possible. An ICD is designed to apply such therapy automatically and quickly to minimize damage to the heart.

An ICD monitors cardiac activity and decides whether electrical therapy is required. For example, if a tachycardia is detected, pacing or cardioversion therapy may be used to terminate the arrhythmia. If fibrillation is detected, defibrillation is the only effective therapy.

Both cardioversion and defibrillation require that a high voltage shock be delivered to the heart. Since it is impractical to maintain high voltage continuously ready for use, ICDs charge energy storage capacitors after detection of an arrhythmia and prior to delivering a shock to the heart.

An ICD system normally includes a high current electrical battery cell, an energy storage reservoir (i.e., charge capacitor), and a step-up transformer and power conversion circuitry to charge the capacitor. Typically, the ICD charges the charge capacitor to a high voltage (700–800 Volts).

Electrolytic capacitors are used in ICDs because they have the most nearly ideal properties in terms of size and ability to withstand relatively high voltage. Typically, these capacitors can be aluminum electrolytic capacitors (either rolled or flat).

Aluminum electrolytic capacitors having aluminum foil plates rolled into a very small volume are generally used in ICDs. By etching the surface of the aluminum foil, the surface area can be further increased such that the capacitance increases accordingly.

Since these capacitors must typically store approximately 30–40 joules, their size can be relatively large, and it is difficult to package them in a small implantable device. Currently available ICDs are relatively large (over 44 cubic centimeters (cc)), generally rectangular devices about 12–16 millimeters (mm) thick. A patient who has a device implanted may often be bothered by the presence of the large object in his or her pectoral region. Furthermore, the generally rectangular shape can in some instances lead to pocket erosion at the somewhat curved corners of the device. For the comfort of the patient, it would be desirable to be able to make smaller and more rounded ICDs. The size and configuration of the capacitors has been a major stumbling block in achieving this goal.

In ICDs, as in other applications where space is a critical design element, it is desirable to use capacitors with the greatest possible capacitance per unit volume. As mentioned above, one way to increase capacitance per unit area in a flat capacitor is to etch the surface of the anode foil perpendicular to the surface thereof. An ICD with flat geometry electrolytic capacitors is described in U.S. Pat. No. 5,131,388 to Pless et al. ("Pless"), which is incorporated herein by reference in its entirety. While such flat capacitors provide an improvement from a packaging and energy density standpoint, the energy or power density can still be greatly improved.

Conventionally, an electrolytic capacitor comprises a series combination of two or more capacitors, wherein each capacitor includes two electrodes (such as metal foils or plates that act as anodes) separated by an electrolyte (that acts as the cathode), with one or both metal foils having a thin dielectric film or barrier layer formed on their adjacent surfaces. Alternatively, the electrolytic capacitor can comprise a single, double, or a higher multiple number of metal anode plates having paper separators covering each anode layer and separating the anode layers from a cathode foil, such as those described in Pless.

Manufacturers of electrolytic capacitors of very small size (also referred to as microcapacitors) that support voltages of about 400 Volts or more face several difficulties. In particular, an important concern is how to prepare a metal foil (also referred to as an anodic foil which is used as an anode plate in the electrolytic capacitor) that maintains a high capacitance while at the same time has a reduced leakage current. The term "leakage current" refers to the current passing between an electrolyte and an anodic foil. Under conventional anodic foil preparation techniques, a barrier oxide layer can be formed onto one or both surfaces of a metal foil by placing the foil into an electrolyte bath and applying a positive voltage to the metal foil and a negative voltage to the electrolyte. This process (also referred to as electrolysis) oxidizes the surface of the metal foil. The oxide film formed during electrolysis normally has a thickness ranging from 0.006 to 1.0 micrometers ($\mu$m). However, the oxide film should be sufficiently thick to support the intended use voltage. This oxide layer provides a high resistance to current passing between the electrolyte and the metal foils, also referred to as the leakage current. A high leakage current can result in the poor performance and reliability of an electrolytic capacitor. In particular, a high leakage current results in greater amount of charge leaking out of the capacitor once it has been charged.

One attempt to lower the leakage current of anodic foils is found in U.S. Pat. No. 5,449,448, issued to Kurihara et al. ("Kurihara"), which is incorporated herein by reference in its entirety. In order to improve the leakage current characteristics of the anode foil utilized in an electrolytic capacitor, Kurihara describes an aluminum foil treatment solution of organic acids or salts. Specifically, Kurihara describes a treatment solution that can include a straight chain saturated dicarboxylic acid with an odd number of carbons, a trans straight chain unsaturated dicarboxylic acid, or an organic acid having an aromatic ring and a carboxyl group. These organic acids are used as a "dip" following a hydration step, and prior to the application of a potential to form a barrier oxide layer. While this organic acid dip lowers the resulting leakage current of the barrier oxide layer formed, it is found in practice that this dip also lowers the capacitance of the metal foil by nearly 10 %, and is therefore impractical for commercial applications.

SUMMARY OF THE INVENTION

The present invention provides an improved anodic foil treatment process. According to one embodiment of the present invention, a barrier oxide layer is formed onto a surface of an anodic foil. The foil is then treated with an oxide dissolving acid composition. The resulting anodic foil maintains its capacitance and exhibits a reduced leakage current. Another embodiment of the present invention provides an electrolytic capacitor comprising an anodic foil formed by the foil treatment process described herein. In another embodiment of the present invention, an implantable cardioverter defibrillator (ICD) comprises an electrolytic capacitor having an improved anodic foil.

According to a preferred embodiment of the present invention, a method of treating an anodic foil comprises hydrating a metallic foil (preferably etched aluminum) in a bath of deionized water at elevated temperatures. Next, the foil is dipped into a bath of a low concentration organic acid composition. The foil is placed in a first forming solution and a first voltage is applied to the foil to form a barrier oxide layer on a surface of the foil. The foil is then heat treated at a very high temperature. After the heat treatment, the foil is placed in a second forming solution and a second voltage is applied to the foil to reform the oxide layer. Preferably, the foil is soaked in the second forming solution for a duration of from about 1 minute to about 10 minutes before the second voltage is applied. Next, the foil is dipped in a bath of a low concentration oxide dissolving acid composition. Finally, the oxide layer of the foil is reformed on the surface of the foil in a third forming solution and at a third voltage. As a result, an anodic foil is produced having a leakage current of less than 2.0 microamperes per square centimeters, having a capacitance of about 1.29 microfarads per square centimeter, and capable of supporting voltages of up to about 400 to 410 Volts.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1A:
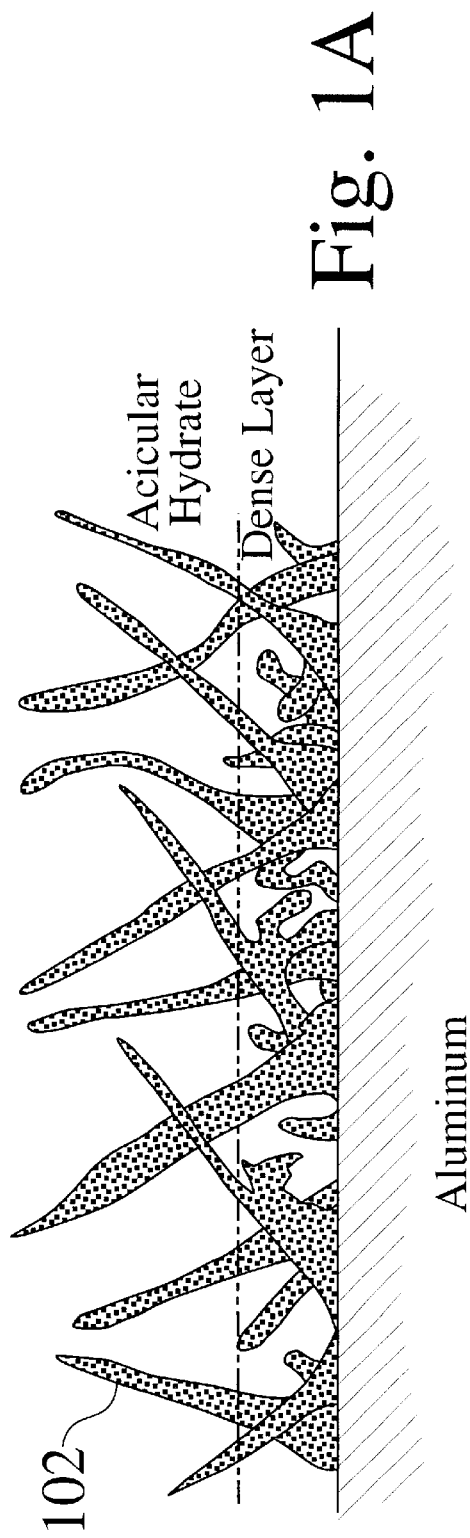
FIGS. 1A and 1B depict the formation of the hydrate layer as a result of a hydration step and a formation step, respectively.

1. Overview and Discussion of the Invention

The present invention is directed towards a foil treatment process, wherein a high quality oxide is formed on a metal foil (also referred to as an anodic foil) to be used in an electrolytic capacitor. This invention is also directed to a high capacitance, low leakage current anodic foil created by the foil treatment process, an electrolytic capacitor incorporating this improved anodic foil, and an Implantable cardioverter defibrillator (ICD) incorporating this electrolytic capacitor. In particular, anodic foils prepared and treated according to the present invention can be incorporated in a high voltage (up to about 400 to 410 Volts) electrolytic capacitor that exhibits a very low leakage current and a high capacitance.

In particular, the present invention provides an improved method of producing high quality oxide on anodic foils to be used in electrolytic capacitors by incorporating an oxide dissolving acid dip into the foil treatment process. The manner in which this high quality oxide is formed on an anodic foil is described in detail below.

2. Oxide Layer Formation and Leakage Current

As discussed above in the Background section, during electrolysis a thin oxide layer ($Al_2O_3$) is formed on the surface of an aluminum foil. This oxide layer acts as a barrier to the flow of current between the electrolyte and the metal foil. However, a small amount of current still passes through the barrier oxide layer, called the "leakage current."

The leakage current is an indicator of the quality of the oxide that is formed on an anodic foil during the formation process. A low leakage current is usually the result of a high quality oxide with a low amount of imperfections. The leakage current is also is a measure of how efficient a capacitor is in delivering stored energy in the capacitor. As mentioned above, the capacitor is charged up and the energy is released in a very quick manner. However, a high leakage current results in greater amount of charge leaking out of the capacitor once it has been charged. Therefore, the capacitor cannot deliver its complete stored energy because some charge has leaked through the oxide. A preferred oxide would be one with zero (or minimal) charge leakage to allow for complete discharge of the stored energy.

Various attempts have been made to reduce the leakage current properties of oxides formed on anodic foils. For example, in a conventional anodic foil formation process, such as described in Kurihara (referenced above), a hydration dip is utilized, where the aluminum foil is placed in a bath of heated pure water, followed by an organic acid "dip." Next, the barrier layer oxide is formed during electrolysis. The introduction of the organic acid dip into the formation process results in a reduced leakage current of the anodic foil.

However, the combination of the hydration dip and the organic acid dip also results in a reduced capacitance of the anodic foil by as much as 7 % or more. For example, a simple foil treatment process using only an electrolysis step may yield an anodic foil with a capacitance of 1 microfarad per square centimeter ($\mu F/cm^2$). This capacitance value is also referred to herein as an "expected" capacitance or an "ideal" capacitance. If a hydration dip and an organic acid dip are also incorporated into the foil treatment process, a measured capacitance would be about 0.92 $\mu F/cm^2$. The difference in measured capacitance values is about 8 percent (%). This type of capacitance reduction is shown in the experimental tests performed by the inventors that are described below in the Example Section.

3. Hydrate Layer Formation and Swelling of the Hydrate Layer

There are several advantages to using a hydration step before electrolysis. First, while aluminum will react with water at any temperature, at temperatures above 80° C. a particular type of aluminum oxide crystalline structure is formed which is advantageous for capacitor related applications. Moreover, even though the hydrate layer by itself cannot support substantial voltages, by forming a hydrate layer before electrolysis, a high quality barrier oxide can result. Further, the costs of performing the hydration step are limited to the cost of the energy required to heat the water.

During a hydration dip, a hydrated film or "hydrate layer" is formed on the surface of the aluminum foil as a result of the chemical reaction between the aluminum surface and the water at elevated temperatures. Briefly, during this chemical reaction, the oxygen in the water is stripped away from its hydrogen and bonds with the aluminum. As a result, the hydrogen is released and a crystalline aluminum oxide is formed on the surface of the aluminum. This crystalline structure is also referred to as Bohmite or pseudo-Bohmite.

On a microscopic level, the hydrate layer comprises two distinctly different layers, a dense layer (which is desired) and a more diffuse layer (which is not desired). The dense layer has a compact, crystalline structure. During electrolysis, this compact, crystalline oxide (i.e., dense) layer is incorporated in the barrier oxide layer in a smooth, homogeneous fashion such that when the barrier oxide layer is formed, it also has a compact or dense structure. Thus, the hydration step helps ensure that a desirable type of oxide is propagated during electrolysis.

In order to achieve the most optimum type of anodic foil, the goal is to make the dense layer as thick as possible. Over time, the reaction rate of the aluminum with heated water falls as an exponential so that after several hours, for example, the reaction rate falls to near zero. At this point in time, all of the available aluminum near the surface has chemically reacted with the hot water. However, by increasing the thickness of the hydrate layer, the thickness of an undesirable diffuse layer is also increased, while the thickness of the desirable dense layer remains largely unchanged.

Figure 1B:
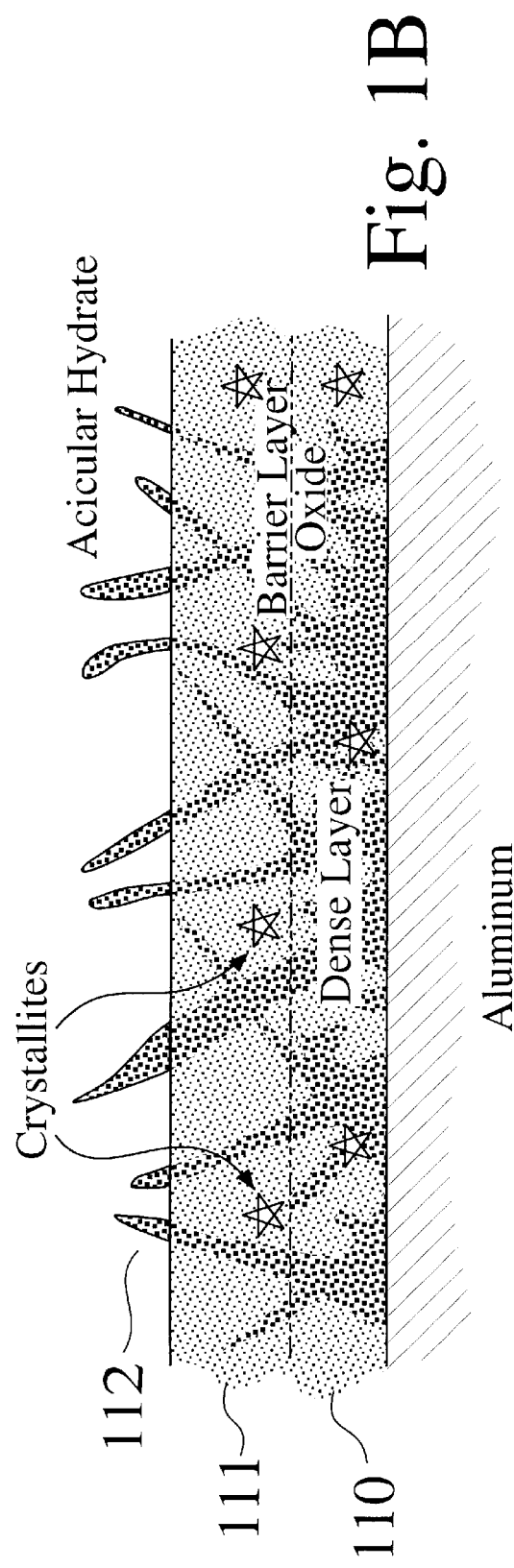

The diffuse layer does not have a compact structure, though it is crystalline in nature. After a hydration step, as shown in FIG. 1A, diffuse layer 102 resembles acicular needles of aluminum oxide. Although the diffuse layer is also incorporated into the barrier layer, the result is a less dense and well ordered oxide with more interstitial vacancies and dislocations. In practice, after a formation step, and as depicted in FIG. 1B, after a dense layer 110 has reached its maximum thickness, there remains a substantial amount of the diffuse layer 112 projecting above barrier layer 111 that should be removed.

With respect to anodic foil applications, the main problem with the unconverted diffuse layer is that it does not contribute much, if anything, to the amount of voltage an anodic foil can withstand. Further, the diffuse layer negatively affects realizing ideal capacitance. By way of simple analogy, the diffuse layer acts to increase the distance between the anode (aluminum foil) and the cathode (the electrolyte), thereby decreasing the capacitance. It would be acceptable if the increase in distance also resulted in an increase in the amount of voltage that could be supported by the capacitor. But with a thick diffuse layer, there is little increase in the amount of voltage that the capacitor foil can support.

As mentioned above, some conventional foil treatment processes utilize the combination of the hydration dip followed by an organic acid dip in a foil treatment process. The organic acid dip serves to improve oxygen transport to both the dense and diffuse layers, resulting in a thicker hydrate layer for the same amount of time the foil is treated in a heated water bath. It is the ability to increase the dense layer thickness that is of primary importance. However, this combination of steps leads to a reduction in the capacitance of the foil. This unacceptable capacitance loss is likely due to excess thickness of the hydrate layer (i.e., the diffuse layer) that swells as a result of adsorbed organic acid from the organic acid dip.

As the inventors have discovered, the excess diffuse layer formed as a result of the hydration step and organic acid dip is more easily dissolved than the true barrier oxide layer. According to the present invention, the anode foil can be improved by the use of an oxide dissolving acid dip in combination with the hydration and organic acid dips, to form a superior anode foil compared to the use of just the organic acid dip alone. Specifically, the use of an oxide dissolving acid dip removes the undesirable diffuse hydrate layer without significantly affecting the dense hydrate layer that is incorporated into the barrier oxide layer as a result of electrolysis. The oxide dissolving step integrated into the formation process allows the capacitance of the anodic foil to be maintained kept to within about 1.0% of its "expected" capacitance, while at the same time maintaining the improved leakage current properties due to the organic acid "dip."

4. Anodic Foil Treatment Method

Figure 2:
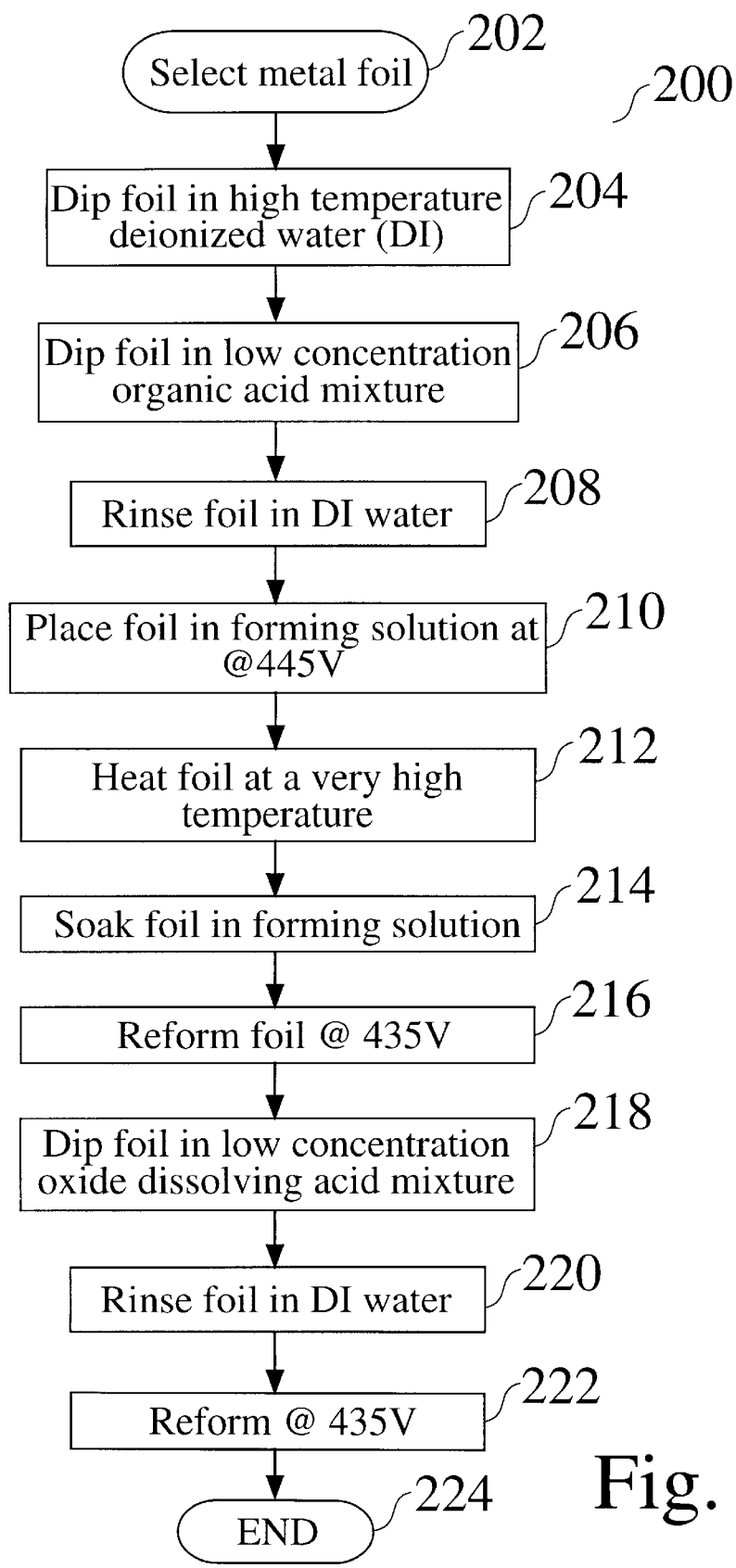
FIG. 2 is a flow-chart of the anodic foil formation process according to a preferred embodiment of the present invention.

FIG. 2 shows an anodic foil formation process 200 according to a preferred embodiment of the present invention. In step 202, an anodic metal foil is selected. According to one embodiment of the present invention, a metal foil can be chosen from a group including, but not limited to, aluminum, tantalum, magnesium, titanium, niobium, and zirconium. Aluminum foil is a preferred anodic foil because of its ability to produce a high quality oxide layer, its conductive properties, and its wide commercial availability.

According to one embodiment of the present invention, either etched or non-etched aluminum foil may be utilized. In a preferred embodiment of the present invention, etched aluminum foil is utilized. Etched foil has an increased surface area. By increasing the surface area of the aluminum foil, capacitance can be increased. For example, aluminum foil having a thickness of about 75 to 125 micrometers ($\mu$m), and with a purity of at least 99.98% and a cubic texture in the (1,0,0) direction of at least 80%, is etched to produce a high surface area with an enlargement of at least 20 times over plain foil. Etching techniques are well known in the art. For example, U.S. Pat. No. 5,715,133, issued to Harrington et al. ("Harrington"), describes a suitable method of etching foil and is incorporated herein by reference in its entirety. However, non-etched aluminum may also be utilized as the anodic foil according to the present invention, as would be apparent to one of skill in the art.

Next, in step 204, the etched aluminum foil is hydrated. As mentioned above, a hydration dip comprises placing the foil in a bath of heated water. According to a preferred embodiment of the present invention, the foil is dipped into a bath of pure (i.e., deionized) water at a temperature ranging from about 80° to 100° C., with a preferred temperature of about 98° C., for a duration of about 1 minute to 10 minutes. The bath of deionized water should have a conductivity of about 16 megaohms—centimeter (M$\Omega$-cm). As mentioned above, by hydrating the foil, the "hydrate"

layer (and its corresponding dense and diffuse layers) is formed on the surface of the foil to help facilitate formation of a high quality oxide layer.

In step 206, the foil is dipped into a bath comprising an organic acid composition. According to one embodiment of the present invention, the organic acid "dip" comprises a low concentration organic acid mixture (or solution). To achieve the maximum reduction in leakage current, the organic acid in this embodiment of the present invention can be chosen from a group of dicarboxylic acids. This group includes, but is not limited to, fumaric, glutaric, malonic, malic, pimelic, succinic, adipic, sebacic, suberic, and maleic acid and salts thereof. In a preferred embodiment, the organic acid is maleic acid.

With respect to concentrations of the organic acid composition, concentrations can range from about 0.1 wt. % (percent by weight) to about 10.0 wt. % organic acid concentration. In a preferred embodiment, the organic acid dip concentration is about 0.5 wt. %. This organic acid dip can be performed at a temperature ranging from about 70° to 95° C., and at a preferred temperature of about 85° C. The duration of the dip can be optimized to allow the improvement of the leakage current of the foil, as would be apparent to one skilled in the art. For example, dip times can range from about 30 seconds to about 20 minutes. In a preferred embodiment, the dip time is about 5 minutes.

In step 208, the foil is taken out of the organic acid mixture and rinsed in an overflow system of deionized water. A thorough rinsing of the foil is helpful in reducing the likelihood of contamination of subsequent formation mixtures and solutions.

Next, in step 210, the barrier oxide layer of the anodic foil is formed on one or both surfaces of the foil in an electrolytic forming composition (also referred to as a "forming solution"). In one embodiment of the present invention, the constituents of the low concentration, aqueous forming solution can be chosen from a group including, but not limited to, azelaic, sebacic, suberic, adipic, deodecanedioic, citric, and related organic acids and their salts. According to a preferred embodiment, the forming solution contains an aqueous solution of citric acid. Also, in a preferred embodiment, the concentration of the electrolytic forming solution is maintained at about 0.03 wt. %. The anodic foil is placed in the forming solution at a temperature ranging from about 80° to 100° C. (with a preferred temperature of about 90° C.).

A conventional power supply can be utilized in step 210 to set the proper voltage and current limits for electrolysis. For example, according to a preferred embodiment, a voltage of about 445 Volts is applied to the anodic foil. The current from the power supply (or "exit" current) eventually lowers (or bleeds down) to about 1.60 milliamperes per square centimeter ($mA/cm^2$) after a duration of time. During formation, the voltage is set to a certain value and is current limited until the preset voltage is reached (i.e., the voltage increases over time until 445 Volts is reached). Once the preset voltage is reached, the current then begins to bleed down over time (i.e., it is voltage limited). The bleed down currents are also preset. Once the preset bleed down current is reached, the power supply is cut off and the foil is removed from the forming solution. If foil samples are all bled down to the same exit current and the voltage is the same as well, then the Effective Formation Voltage (EFV) should be held constant from foil to foil for multiple foil treatment runs.

After step 210 is completed, a heat treatment is applied to the foil in step 212. The heat treatment involves subjecting the foil to very high temperatures for a certain period of time. According to one embodiment, the foil can be placed in an oven or furnace at a temperature of about 450° to about 550° C. and for a duration of about 1 minute to 10 minutes. According to a preferred embodiment, the foil is placed in an oven for 4 minutes at a temperature of about 500° C.

In step 214, a foil soaking step is performed, wherein the foil is placed in a forming solution for a period of time prior to electrolysis. For example, the anodic foil can be placed in a second, low concentration forming solution. The constituents of the second forming solution can be chosen from the same group of compounds that were described above with respect to step 210. In a preferred embodiment, the anodic foil is returned to the same electrolytic forming solution as was used in step 210. The anodic foil is allowed to soak in the second forming solution for about 1 minute to about 10 minutes, with a preferred time of about 2 minutes.

Next, in step 216, a second formation step (also referred to as a "reform" step) is performed in the second forming solution. Step 216 can be utilized to reform the barrier oxide layer on the surface of the anodic foil. In addition, this reform step is helpful in optimizing the leakage current and capacitance characteristics of the anodic foil because the oxide layer formed during the first forming step (step 210) may be slightly cracked as a result of the heat treatment of step 212. In a preferred embodiment, step 216 is performed using the same electrolytic forming solution and within the same temperature ranges as is performed in step 210. Preferably, step 216 is performed at a slightly lower potential of about 435 Volts in order to help reduce the leakage current even further. The current flowing through the formed oxide layer as a result of this reform step eventually lowers to a preset exit current value of about 0.8 $mA/cm^2$.

In step 218, the anodic foil is removed from the second formation solution and placed in an oxide dissolving acid composition. As mentioned above, the oxide dissolving acid step is helpful in removing the undesirable diffuse layer constituent of the hydrate layer. In one embodiment of the present invention, the anodic foil can be dipped in a low concentration oxide dissolving acid solution. The constituents of the oxide dissolving acid solution can be chosen from a group of acids including, but not limited to, phosphoric, formic, acetic, citric, oxalic, and acids of the halides. In a preferred embodiment, an aqueous solution of phosphoric acid is utilized in this step, having a concentration of about 1.0 wt. % to about 10.0 wt. %, with a preferred concentration of about 2.0 wt. %. According to a preferred embodiment, the oxide dissolving acid solution is maintained at a temperature ranging from about 60° to 90° C., with a preferred temperature of about 70° C.

In practice, it is observed that the longer the foil remains in the oxide dissolving solution, the greater the reduction of the excess swelling of the hydrate layer. As would be apparent to one of skill in the art, the amount of time the foil is kept in the oxide dissolving solution can be optimized. For example, according to a preferred embodiment of the present invention, the foil may be placed in the oxide dissolving solution for a duration of about 10 minutes to about 25 minutes, with a preferred time of 16 minutes.

Next, in step 220, the anodic foil is rinsed in an overflow system of de- ionized water, under similar conditions as was discussed above with respect to step 208. Lastly, in step 222, the anodic foil is reformed in a third formation solution at a voltage of about 435 Volts. According to a preferred embodiment of the present invention, the constituent concentrations and temperature ranges utilized in step 222 are similar to those described above for step 216.

As would be apparent to those of skill in the art based on the above description, the anodic foil treatment process of the present invention can be implemented into a mass production process in a relatively straightforward manner. However, in order to achieve optimal results, it is important to monitor several treatment parameters.

Besides accurately monitoring the voltage levels and operating temperatures of the various baths and dips, it is also important to monitor and adjust the organic acid concentration. For example, one method of monitoring the organic acid concentration is by performing a conductivity measurement of the particular organic acid mixture being used. By knowing the conductivity of a particular organic acid before anodic foils are dipped (the value can be obtained by pre-processing conductivity measurements), the optimal concentration of the organic acid dip can be maintained by adjusting the concentration to fall within an optimal conductivity range. By way of example, it was discovered that an optimal conductivity of a maleic acid solution, having a concentration of about 0.5 wt. %, ranged from about 11 milli-Siemens (mS) to about 12 mS. If the conductivity of the maleic acid solution fell below a certain level (e.g., 11 mS), more maleic acid solution was added to the organic acid dip until the conductivity rose to within the optimal range. These monitoring and adjusting steps can be utilized for any of the organic acid dips chosen, as would be apparent to one skilled in the art.

5. Examples

An investigation was conducted examining the capacitance and leakage current characteristics of the foils produced according to the present invention. The capacitance and leakage current measurements show that a foil treatment process incorporating both the organic acid dip and the oxide dissolving acid dip maintains a reduced leakage current due to the use of the organic acid dip alone, as well as provides a significant improvement in the measured capacitance.

(a) Leakage Current Measurements

Eleven organic acid solutions (corresponding to the acids listed below in Table 1) were tested. Aqueous solutions comprising these acids were prepared, with organic acid concentrations of about 0.5 wt. %. Two anodic foil samples per organic acid solution were used in the tests. The test foils were etched aluminum foil coupons, manufactured by Japan Condenser Company, having an area of about 12.5 $cm^2$. Other aluminum foils are widely available from many commercial vendors.

The test foils were dipped into an organic acid solution at a temperature of about 85° C. for about 5 minutes after hydration in a deionized water bath. After the test foils were removed from their respective acid dips, they were rinsed in an overflow bath system. Prior tests have shown that if the rinse is not adequate, the forming solution can become contaminated and the current will not drop to the set current of 1.6 $mA/cm^2$ for formation. The test foils were then processed according to the formation, oxide dissolving, reform, and rinse steps described above in the previous section.

The Effective Formation Voltage (EFV or V) used in the electrochemical processing was about 435 Volts for each test foil. The electrolyte bath for the barrier oxide layer formation comprised an aqueous solution of 0.03% citric acid at a temperature of about 85° C. and at a current of about 5 mA (0.4 $mA/cm^2 \times 12.5$ $cm^2$). With respect to the leakage current tests, the power supply was set to about 363 Volts (435 Volts divided by 1.2) and at a current of about 5 mA (0.4 $mA/cm^2 \times 12.5$ $cm^2$). The leakage current was measured after one hour at a temperature of about 85° C.

Test results are provided in Table 1 below. The first column lists the particular organic acid utilized in the organic acid dip, while the second and third columns provide the leakage current values in different units. In particular, column 3 provides the leakage current ($I_L$) in units of microamperes ($\mu A$) per unit Capacitance (C) multiplied by the EFV (V). Because both leakage current and capacitance vary as a function of different EFVs, this expression allows for leakage current measurements performed on foils formed under different conditions to be compared on a relative scale. The fourth column lists the percentage of control of the leakage current, which is an expression representing the ratio of the leakage current for foil dipped in a particular organic acid, versus the leakage current of the control sample.

TABLE 1

| Organic Acid | $I_L$ ($\mu A/cm^2$) | $I_L$ ($\mu A/CV$) | Percentage of Control $I_L$ |
|---|---|---|---|
| None (control sample) | 4.03 | 0.0121 | — |
| Fumaric | 2.20 | 0.0066 | 54.5 |
| Glutaric | 3.39 | 0.0102 | 84.3 |
| Malonic | 2.72 | 0.0081 | 66.9 |
| Malic | 2.56 | 0.0077 | 63.6 |
| Pimelic | 2.44 | 0.0073 | 60.3 |
| Succinic | 2.20 | 0.0066 | 54.5 |
| Adipic | 2.48 | 0.0074 | 61.2 |
| Azelaic | 2.56 | 0.0077 | 63.6 |
| Sebacic | 1.88 | 0.0056 | 46.3 |
| Suberic | 2.28 | 0.0068 | 56.2 |
| Maleic | 1.60 | 0.0048 | 39.7 |

Test results indicate that maleic acid produced the greatest lowering effect of the leakage current as compared to the control, where no organic acid dip was utilized. The leakage current of the maleic acid dip sample was lowered by over 60% as compared to the control sample. Similarly, all of the other organic acids tested (with the exception of glutaric acid) yielded significant leakage current reductions ranging from about 33% to about 54%.

Figure 3:
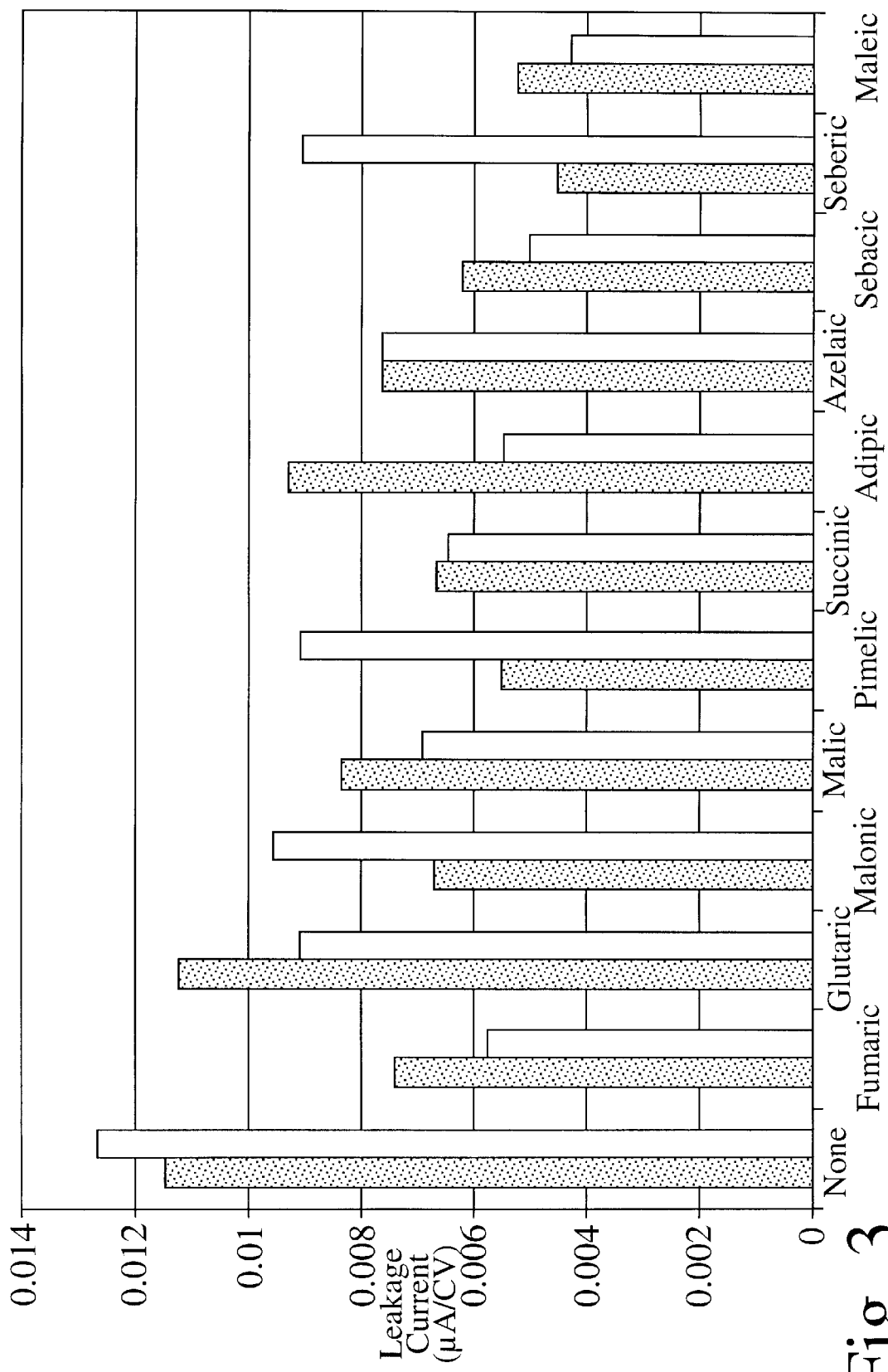
FIG. 3 depicts results from leakage current tests.

FIG. 3 shows the two samples for each organic acid dip tested, and their corresponding leakage current. With the exception of pimelic acid and suberic acid, the leakage current measurements are within ±20% for each test sample. The observed variations in leakage current are likely due to electrolyte contamination during the leakage current measurement. It was also observed that suberic acid at a 0.5% solution would not completely dissolve into the deionized water, which likely gave an uneven attack of the acid on the oxide layer of the foil surface. This problem likely caused the variation in leakage current measurements.

(b) Capacitance Measurements

An investigation was conducted comparing the capacitance characteristics of the foils produced according to the present invention and foils produced according to the process of Kurihara (referenced above). The results are shown in Table 2. Taken in combination with the results from Table 1, the above invention produces excellent anodic foil with an improved leakage current 60% or more lower than foils formed without the organic acid dip, and without the reduction of capacitance.

TABLE 2

| | Expected Values (control sample) | Kurihara Method (test sample #1) | Method of Present Invention (test sample #2) |
|---|---|---|---|
| Capacitance in $\mu F/cm^2$ | 1.292 | 1.200 | 1.290 |
| Leakage Current in $\mu A/cm^2/CV$ | 0.006191 | 0.002144 | 0.003814 |

TABLE 2-continued

|  | Expected Values (control sample) | Kurihara Method (test sample #1) | Method of Present Invention (test sample #2) |
| --- | --- | --- | --- |
| Percent of Expected Leakage Current in $\mu A/cm^2/CV$ | — | 65.4 | 38.4 |
| Percent of Drop From Expected Capacitance in $\mu F/cm^2$ | — | 7.12 | 0.15 |

The first column of Table 2 lists the "expected" values for the capacitance and leakage current characteristics of a test sample that does not undergo an organic acid dip or an oxide dissolving dip (the control sample). The control sample underwent the formation step described above (see e.g., step 210). For example, the measured capacitance of the control sample was 1.292 $\mu F/cm^2$. This value corresponds to the "expected" capacitance for the anodic foil.

The second column lists the characteristics of test sample #1, which was produced according to the method of Kurihara. Test sample #1 underwent the hydration, organic acid dip, and formation steps described above. The third column lists the characteristics of test sample #2, which was produced according to the method of present invention. Test sample #2 was treated according to the hydration, formation, oxide dissolving, reform, and rinse steps described above in the previous section. All capacitance measurements were performed using conventional bridge equipment.

The results in Table 2 show that capacitance of test sample #2 is less than 0.2% reduction from the "expected" capacitance of the control sample. This quantity is measured as one minus the ratio of the capacitance of test sample #2 to the capacitance of the control sample. In contrast, the capacitance of test sample #1 was reduced by more than 7% as compared to the "expected" capacitance of the control sample. For many practical applications, such as for ICDs, a capacitance drop of this amount is unacceptable.

Concerning the improvement in leakage current of test sample #2 as compared to the control sample, the reduction of the leakage current (see row 3 of Table 3) was only about 40% for test sample #2. Nevertheless, this value still represents a significant improvement over the control sample. Thus, according to the method of the present invention, the leakage current of a treated anodic foil can be reduced by as much as 60% (see Table 2 above), without reducing the capacitance of the treated foil by a significant amount.

6. Example Implantable Cardioverter Defibrillator (ICD)

Anodic foils that are processed according to the method of the present invention described above can be utilized for a variety of applications that require a metal foil having a high quality oxide layer formed on its surface. For example, anodic foils are widely utilized in high voltage electrolytic capacitors. These capacitors can be very compact in size as discussed above. These capacitors can be designed and manufactured according to several known methods such as those described in the Harrington patent (referenced above). Of particular interest, are compact electrolytic capacitors designed for use in ICDS.

Figure 4:
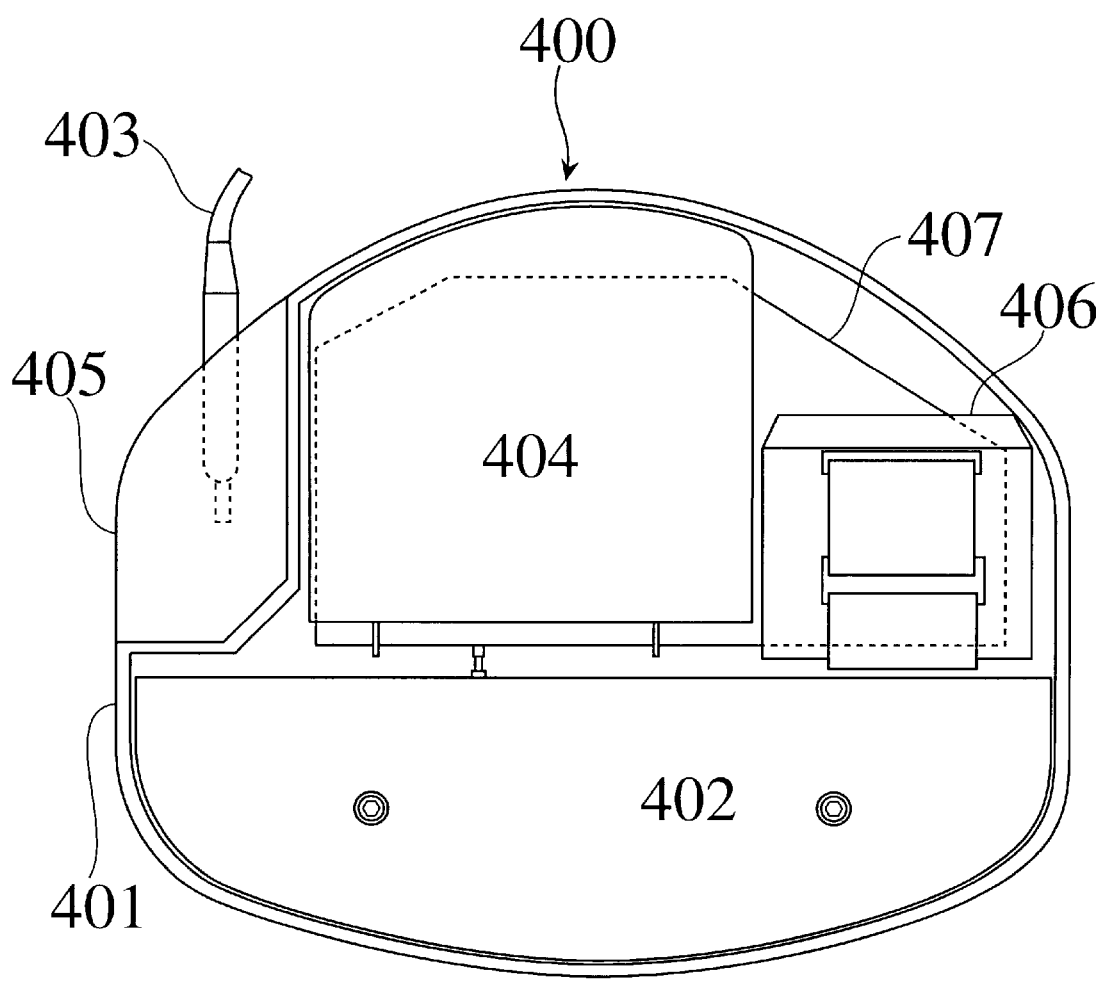
FIG. 4 depicts an example implantable cardioverter defibrillator (ICD).

FIG. 4 shows a schematic diagram of an example ICD 400, such as that described in U.S. Pat. No. 5,522,851 issued to Fayram (incorporated by reference herein in its entirety). ICD outer housing 401 contains one or more flat capacitors 402 (only one is shown), which comprise foils treated according to the process of the present invention. Capacitors 402 can be designed to conform to the size requirements of ICD 400. Typically, two capacitors connected in series are utilized in ICDs to provide higher voltage (about 700–800 Volts) for the ICD. Capacitors 402 can be constructed as a planar layered structure of single, double, or higher multiple anode plates (i.e., anodic foils produced in accordance with the process described above), or as so described in the Fayram patent.

A single pass endocardial lead set 403 extends from outer housing 401 into the patient's heart. Header 405 is used for the attachment of lead set 403. ICD 400 also contains a battery 404 that provides electrical energy to charge capacitors 402 when needed so that it may provide a high voltage shock. ICD 400 further contains control circuitry 407 and a power transformer 406 that is used in the charging of capacitors 402. Control circuitry 407 connects to lead set 403 so that it may sense and analyze electrical signals from the heart, and control the delivery of an appropriate therapy.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all patents, patent applications and publications mentioned above are incorporated by reference herein.

What if claimed is:

1. A method for producing an anodic foil, comprising the steps of:
    (a) hydrating the foil,
    (b) dipping the foil into a bath of an organic acid composition;
    (c) removing the foil from the organic acid bath and placing the foil in a first forming composition and applying a first potential to form an oxide layer on said first surface of the foil: and
    (d) applying an oxide dissolving acid composition to said oxide layer.

2. The method of claim 1, wherein said oxide dissolving acid composition comprises an aqueous solution of an oxide dissolving acid, said oxide dissolving acid selected from the group of acids consisting of phosphoric acid, formic acid, acetic acid, citric acid, oxalic acid, and acids of the halides.

3. The method of claim 2, wherein step (d) comprises dipping the foil in a bath comprising an aqueous solution of phosphoric acid for a time duration of about 10 minutes to about 25 minutes, said phosphoric acid present in a concentration of from about 1 wt. % (percent by weight) to about 10 wt. %, and said phosphoric acid solution having a temperature of from about 60° C. to about 90° C.

4. The method of claim 2, wherein after step (d) is completed, the foil is rinsed in an overflow bath of deionized water.

5. The method of claim 1, further comprising the step of:
    (e) reforming said oxide layer on said first surface of the foil.

6. The method of claim 1, further comprising the step of:
    monitoring a concentration of said organic acid composition by measuring a conductivity of said organic acid composition, wherein said concentration of said organic acid composition is adjusted if a value of said conductivity falls outside a predetermined conductivity value range.

7. The method of claim 1, wherein said dipping step comprises dipping said foil in a bath of an organic acid composition at a temperature of from about 70° C. to about 95° C., for a time duration of about 30 seconds to about 20 minutes.

8. The method of claim 7, wherein said organic acid composition is an aqueous solution of a dicarboxylic acid or salt thereof.

9. The method of claim 8, wherein said organic acid composition is selected from the group consisting of fumaric acid, glutaric acid, malonic acid, malic acid, pimelic acid, succinic acid, adipic acid, sebacic acid, suberic acid, and maleic acid and salts thereof.

10. The method of claim 1, wherein said hydrating step comprises, hydrating the foil in a bath of deionized water at a temperature of from about 80 Celsius (°C.) to about 100° C., for a time duration of from about 2 minutes to about 30 minutes, wherein said bath of deionized water has a conductivity of about 16 megaohms-centimeter (MΩ-cm).

11. The method of claim 1, wherein the foil is placed in said first forming composition at a temperature of from about 85° C. to about 100° C., wherein said first voltage is about 445 Volts, and wherein said first forming composition comprises an aqueous solution of a low concentration organic acid.

12. The method of claim 11, wherein said organic acid of said first forming composition is selected from the group consisting of azelaic acid, sebacic acid, suberic acid, adipic acid, deodecanedioic acid, and citric acids and their salts.

13. The method of claim 1 wherein said organic acid dip has a concentration of from about 0.1 wt. % (percent by weight) to about 10 wt. %.

14. The method of claim 1, wherein after step (c) is completed, the method further comprises the step of:

heat treating the foil.

15. The method of claim 14, wherein said heat treating step comprises heat treating the foil in an oven at a temperature of about 450° C. to about 550° C. for a time duration of about 1 minute to about 10 minutes.

16. The method of claim 14, wherein after said heat treating step is completed, the method further comprises the step of:

placing the foil in a second forming composition wherein the foil is soaked in said second forming composition for a time duration of from about 1 minute to about 10 minutes.

17. The method of claim 16, further comprising the step of:

applying a second voltage to the foil to reform said oxide layer, wherein said second voltage is about 435 Volts.

18. A method for producing an anodic foil to be used in an electrolytic capacitor, comprising the steps of:

(a) providing a metallic foil having first and second surfaces;

(b) hydrating said foil in a bath of deionized water at a temperature of about 80° C. to about 100° C., (c) dipping said foil into a bath of an organic acid mixture and then removing said foil from said organic acid mixture;

(d) forming an oxide layer on said first surface by placing said foil in a first forming solution and applying a first voltage to said foil;

(e) dipping said foil in a bath of an oxide dissolving acid mixture; and (f) reforming said oxide layer by placing said foil in a second forming solution and applying a second voltage to said foil.

* * * * *